US009545580B2

(12) United States Patent  
Litos et al.

(10) Patent No.: US 9,545,580 B2
(45) Date of Patent: Jan. 17, 2017

(54) COMPUTER SYSTEMS AND COMPUTER-IMPLEMENTED METHODS FOR CONDUCTING AND PLAYING PERSONALIZED GAMES BASED ON VOCAL AND NON-VOCAL GAME ENTRIES

(71) Applicant: Intralot S.A.—Integrated Lottery Systems and Services, Athens (GR)

(72) Inventors: Evangelos Litos, Athens (GR); George Zenzefilis, Athens (GR); Antonios Dimos, Athens (GR); Vasiliki Velitsou, Athens (GR); Androniki Tzivanaki, Athens (GR); Andreas Ninios, Athens (GR)

(73) Assignee: Intralot S.A. — Integrated Lottery Systems and Services, Athens (GR)

( * ) Notice: Subject to any disclaimer, the term of this patent is extended or adjusted under 35 U.S.C. 154(b) by 247 days.

(21) Appl. No.: 14/532,929

(22) Filed: Nov. 4, 2014

(65) Prior Publication Data
US 2015/0126262 A1 May 7, 2015

Related U.S. Application Data

(60) Provisional application No. 61/899,442, filed on Nov. 4, 2013.

(51) Int. Cl.
*G06F 17/00* (2006.01)
*G06F 19/00* (2011.01)
(Continued)

(52) U.S. Cl.
CPC ............ *A63F 13/63* (2014.09); *A63F 13/215* (2014.09); *G07F 17/32* (2013.01);
(Continued)

(58) Field of Classification Search
CPC .... A63F 13/215; A63F 13/216; A63F 13/217; A63F 13/22; A63F 13/33; A63F 13/332; A63F 13/335; A63F 13/424; A63F 13/60; A63F 13/63; G07F 17/32; G07F 17/3206; G07F 17/3209; G07F 17/3225; G07F 17/3227; G07F 17/329
See application file for complete search history.

(56) References Cited

U.S. PATENT DOCUMENTS

| | | | | |
|---|---|---|---|---|
| 4,959,783 A | * | 9/1990 | Scott | ........................ A63F 13/12 379/77 |
| 2003/0045341 A1 | * | 3/2003 | Itkis | ....................... A63F 3/0645 463/19 |

(Continued)

FOREIGN PATENT DOCUMENTS

| | | |
|---|---|---|
| WO | 01/76704 A | 10/2001 |
| WO | 2007/008714 A2 | 1/2007 |
| WO | 2013/128296 A1 | 9/2013 |

OTHER PUBLICATIONS

International Search Report and Written Opinion from International Application No. PCT/IB2014/002999 dated Apr. 30, 2015.

*Primary Examiner* — Milap Shah
(74) *Attorney, Agent, or Firm* — Greenberg Traurig, LLP

(57) ABSTRACT

In some embodiments, the instant invention provides for a computer system that includes at least one server and software stored on a computer readable medium accessible by the at least one server; at least one database accessible by the at least one server and is configured to store the game data of the at least one personalized game; a plurality of specifically programmed input devices, where the at least one server, the at least one database and the plurality of specifically programmed input devices are connected through a computer network; where the plurality of specifically programmed input devices are at least a thousand of (Continued)

specifically programmed input devices; and where the at least one server is configured to manage, in real-time, the at least a thousand of specifically programmed input devices.

14 Claims, 4 Drawing Sheets

(51) Int. Cl.
  *A63F 13/00* (2014.01)
  *A63F 13/63* (2014.01)
  *A63F 13/215* (2014.01)
  *G10L 17/22* (2013.01)
  *G07F 17/32* (2006.01)

(52) U.S. Cl.
  CPC ........ *G07F 17/3206* (2013.01); *G07F 17/329* (2013.01); *G07F 17/3209* (2013.01); *G07F 17/3272* (2013.01); *G10L 17/22* (2013.01)

(56) References Cited

U.S. PATENT DOCUMENTS

| | | | |
|---|---|---|---|
| 2009/0042633 A1 | 2/2009 | Yacenda | |
| 2009/0227375 A1* | 9/2009 | Weisman | ................ A63F 13/12 463/41 |
| 2013/0072280 A1 | 3/2013 | Yacenda | |

\* cited by examiner

COMPUTER SYSTEMS AND COMPUTER-IMPLEMENTED METHODS FOR CONDUCTING AND PLAYING PERSONALIZED GAMES BASED ON VOCAL AND NON-VOCAL GAME ENTRIES

RELATED APPLICATIONS

This application claims the priority of U.S. provisional application U.S. Patent Appln. No. 61/899,442; filed Nov. 4, 2013; entitled "COMPUTER-IMPLEMENTED METHODS AND COMPUTER SYSTEMS RELATED TO CONDUCTING AND PLAYING GAMES SUCH AS LOTTERY GAMES," which is incorporated herein by reference in its entirety for all purposes.

TECHNICAL FIELD

In some embodiments, the instant invention is related to computer methods/systems to conduct and play games.

BACKGROUND

In computer science and electrical engineering, speech recognition is the translation of spoken words into text. Speech recognition is also known as "automatic speech recognition" (ASR), "computer speech recognition", or "speech to text" (STT). Speech recognition applications include voice user interfaces such as voice dialing (e.g., "call home"), call routing (e.g., "I would like to make a collect call"), domotic appliance control, search (e.g., find a podcast where particular words were spoken), simple data entry (e.g., entering a credit card number), reparation of structured documents (e.g., a radiology report), speech-to-text processing (e.g., word processors or emails), and aircraft (typically termed Direct Voice Input). The term "voice recognition" or "speaker identification" refers to identifying the speaker, rather than what they are saying. Recognizing the speaker can simplify the task of translating speech in systems that have been trained on a specific person's voice or it can be used to authenticate or verify the identity of a speaker as part of a security process.

SUMMARY OF INVENTION

In some embodiments, the instant invention provides for a computer system, including: a) at least one server and software stored on a computer readable medium accessible by the at least one server; where the software is at least configured to: i) generate, in real-time, game data of at least one personalized game based, at least in part, on at least one data source, where the at least one data source is identified by at least one user, where the at least one data source includes values corresponding to at least one of the following parameters: 1) at least one meteorological condition of at least one particular locality, 2) at least one sports-related statistic, 3) at least one geographic descriptors, 4) at least one financial statistic, 5) at least one statistic regarding at least one activity of the at least one user, being derived from a personal portable computer device of the at least one user, 6) at least one statistic regarding information being stored on the personal portable computing device of the at least one user, or 7) any combination thereof; ii) receive, in real-time, game input from the at least one user to play the at least one personalized game, iii) determine, in real-time, an outcome of playing the at least one personalized game by the at least one user, and iv) output, in real-time, the outcome of playing the at least one personalized game to the at least one user; b) at least one database accessible by the at least one server and is configured to store the game data of the at least one personalized game; c) a plurality of specifically programmed input devices, where each specifically programmed input device is configured to: 1) receive, in real-time, a vocal input from at least one user; 2) dynamically determine, in real-time, at least one voice characteristic of the vocal input from the at least one user, based, at least in part, on at least one of: (i) a duration of the vocal input time, and (ii) an intensity of at least one waveform, where the intensity of at least one waveform is calculated based, at least in part, on at least one of: (1) a periodic vibration of vocal folds of the at least one user, and (2) an aperiodic sound produced by turbulence at a constriction in a vocal tract of the at least one user; 3) dynamically determine, in real-time, at least one first game entry for the at least one personalized game, based, at least in part, on the at least one voice characteristic of the vocal input of the at least one user; 4) receive, in real-time, non-vocal input from the at least one user, 5) dynamically determine, in real-time, at least one second game entry for the at least one personalized game, based, at least in part, on the non-vocal input of the at least one user; 6) where the at least one first game entry, the at least one second game entry, or both identify the at least one data source for the at least one personalized game being generated by the software of the at least one server; where the at least one server, the at least one database and the plurality of specifically programmed input devices are connected through a computer network; where the plurality of specifically programmed input devices are at least a thousand of specifically programmed input devices; and where the at least one server is configured to manage, in real-time, the at least a thousand of specifically programmed input devices.

In some embodiments, the at least one personalized game is a lottery game. In some embodiments, the specifically programmed input device is a personal portable computing device.

In some embodiments, the at least one server is further configured to: determine at least one well-being condition of the at least one user based, at least in part, on the at least one voice characteristic of the vocal input of the at least one user, wherein the at least one well-being condition is a condition selected from the group consisting of: tiredness, anxiety, intoxication, a measurable psychological condition, a measurable physiological condition, or any combination thereof; determine an ability of the at least one user to play the at least one personalized game based, at least in part, on the at least one well-being condition of the at least one user; and deliver at least one alert to the at least one user based, at least in part, on the ability of the at least one user to play the at least one personalized game being determined from the at least one well-being condition of the at least one user.

In some embodiments, the at least one server is further configured to terminate the at least one personalized game when the at least one well-being condition is a condition selected from the group consisting of: tiredness, anxiety, intoxication, a measurable psychological condition, a measurable physiological condition, or any combination thereof.

In some embodiments, each specifically programmed input device is further configured to: a) receive at least one payment parameter from the at least one user, and b) obtain at least one payment based on the at least one payment parameter being received from the at least one user.

In some embodiments, the at least one payment parameter includes at least one instruction to play the at least one personalized game when a predetermined threshold set by the at least one user is reached, where the predetermined threshold identifies at least one of: a predetermined prize amount, a predetermined wallet balance, a predetermined period of time elapsed since a previous game, or any combination thereof.

In some embodiments, the at least one server is further configured to combine the at least one first game entry, the at least one second game entry, or both, with at least one third game entry being received from at least one other user to play the at least one personalized game of the at least one user.

In some embodiments, the instant invention provides for a computer method that includes: a) generating, by software, in real-time, game data of at least one personalized game based, at least in part, on at least one data source, where the at least one data source is identified by at least one user, where the at least one data source includes values corresponding to at least one of the following parameters: 1) at least one meteorological condition of at least one particular locality, 2) at least one sports-related statistic, 3) at least one geographic descriptors, 4) at least one financial statistic, 5) at least one statistic regarding at least one activity of the at least one user, being derived from a personal portable computer device of the at least one user, 6) at least one statistic regarding information being stored on the personal portable computing device of the at least one user, or 7) any combination thereof; b) receiving, by at least one server, in real-time, game input from the at least one user to play the at least one personalized game, c) determining, by the at least one server, in real-time, an outcome of playing the at least one personalized game by the at least one user, and d) outputting, by the at least one server, in real-time, the outcome of playing the at least one personalized game to the at least one user, e) receiving, by a specifically programmed input device, in real-time, a vocal input from at least one user; f) dynamically determining, by the specifically programmed input device, in real-time, at least one voice characteristic of the vocal input from the at least one user, based, at least in part, on at least one of: (i) a duration of the vocal input time, and (ii) an intensity of at least one waveform, where the intensity of at least one waveform is calculated based, at least in part, on at least one of: (1) a periodic vibration of vocal folds of the at least one user, and (2) an aperiodic sound produced by turbulence at a constriction in a vocal tract of the at least one user, g) dynamically determining, by the specifically programmed input device, in real-time, at least one first game entry for the at least one personalized game, based, at least in part, on the at least one voice characteristic of the vocal input of the at least one user: h) receiving, by the specifically programmed input device, in real-time, non-vocal input from the at least one user; i) dynamically determining, by the specifically programmed input device, in real-time, at least one second game entry for the at least one personalized game, based, at least in part, on the non-vocal input of the at least one user; where the at least one first game entry, the at least one second game entry, or both identify the at least one data source for the at least one personalized game being generated by the software of the at least one server.

In some embodiments, the at least one personalized game is a lottery game. In some embodiments, the specifically programmed input device is a personal portable computing device.

In some embodiments, the computer method further includes: determining, by the at least one server, at least one well-being condition of the at least one user based, at least in part, on the at least one voice characteristic of the vocal input of the at least one user, where the at least one well-being condition is a condition selected from the group consisting of: tiredness, anxiety, intoxication, a measurable psychological condition, a measurable physiological condition, or any combination thereof; determining, by the at least one server, an ability of the at least one user to play the at least one personalized game based, at least in part, on the at least one well-being condition of the at least one user; and delivering, by the at least one server, at least one alert to the at least one user based, at least in part, on the ability of the at least one user to play the at least one personalized game being determined from the at least one well-being condition of the at least one user.

In some embodiments, the computer method includes: terminating, by the at least one server, the at least one personalized game when the at least one well-being condition is a condition selected from the group consisting of: tiredness, anxiety, intoxication, a measurable psychological condition, a measurable physiological condition, or any combination thereof.

In some embodiments, the computer method includes: a) receiving, by the specifically programmed input device, at least one payment parameter from the at least one user, and b) obtaining, by the specifically programmed input device, at least one payment based on the at least one payment parameter being received from the at least one user.

In some embodiments, the at least one payment parameter includes at least one instruction to play the at least one personalized game when a predetermined threshold set by the at least one user is reached, where the predetermined threshold identifies at least one of: a predetermined prize amount, a predetermined wallet balance, a predetermined period of time elapsed since a previous game, or any combination thereof.

In some embodiments, the computer method includes: combining, by the at least one server, the at least one first game entry, the at least one second game entry, or both, with at least one third game entry being received from at least one other user to play the at least one personalized game of the at least one user.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

Figure 1:
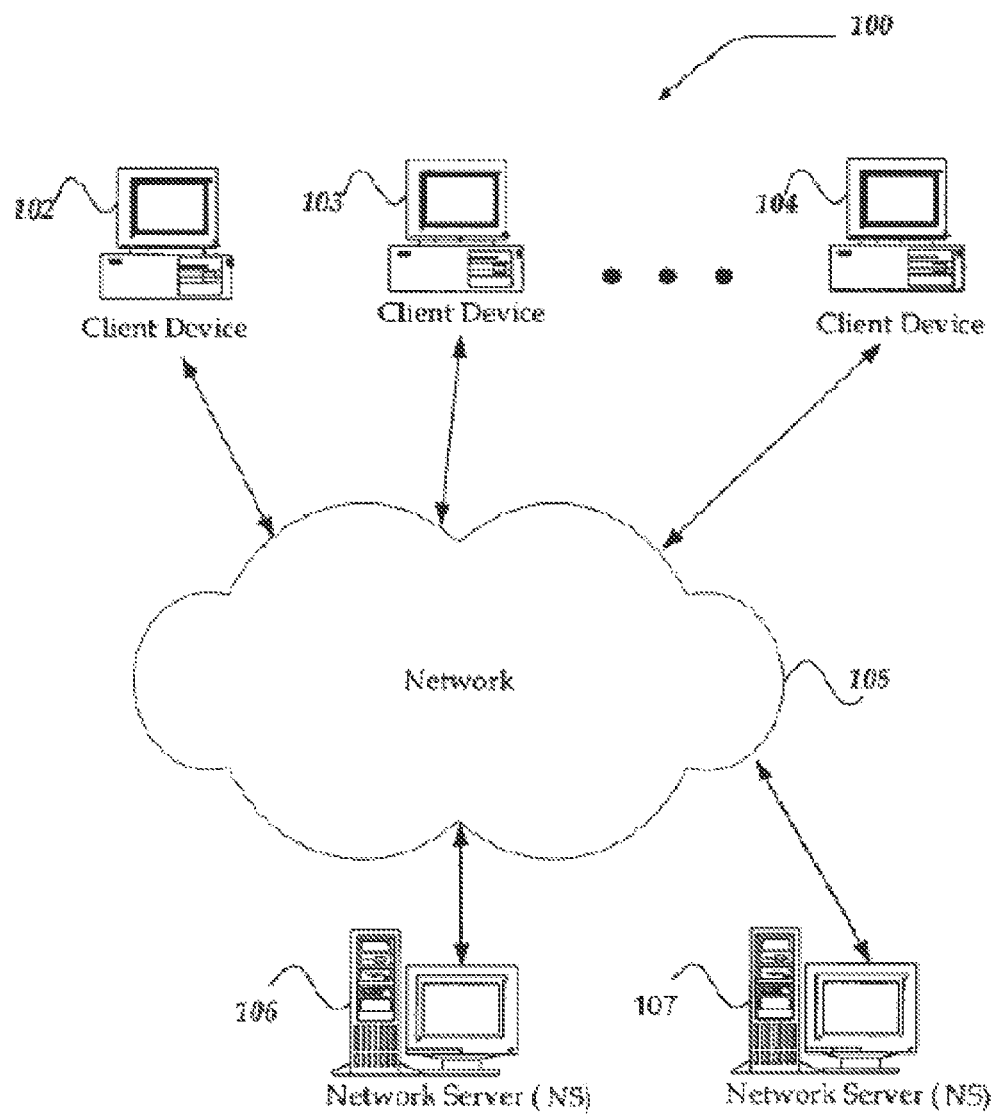
FIG. 1 illustrates some embodiments of the inventive system of the present invention, showing network servers communicating with client devices by use of a network.

In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms.

In addition, each of the examples given in connection with the various embodiments of the invention which are intended to be illustrative, and not restrictive.

DESCRIPTION OF EXEMPLARY EMBODIMENTS

Among those benefits and improvements that have been disclosed, other objects and advantages of this invention will become apparent from the following description taken in conjunction with the accompanying figures. Detailed embodiments of the present invention are disclosed herein: however, it is to be understood that the disclosed embodiments are merely illustrative of the invention that may be embodied in various forms. In addition, each of the examples given in connection with the various embodiments of the invention which are intended to be illustrative, and not restrictive.

Throughout the description, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and dynamically. As used herein, the term "real-time" means that an event/action can occur instantaneously or almost instantaneously in time when another event/action has occurred.

As used herein, the term "dynamic(ly)" means that an event/action that can occur without any human intervention. The event/action may be in real-time and/or hourly, daily, weekly, monthly, etc.

While examples provided in the description are primarily directed to playing and conducting lottery games, those examples are not restrictive and other types of wager and non-wager games can be played and/or conducted in accordance with the principles of the exemplary embodiments of the instant invention that are disclosed herein.

1. Examples Related to Computer-Implemented Methods for Receiving Game Data/Selections from Player(s)

In some embodiments, when playing on interactive channels (internet, mobile/tablet, itv, self-service terminals in a retail establishment, etc.), the instant invention allows a plurality of methods that player(s) can utilize, whether each method separately or in combination with others, to complete game data required to complete an entry into, for example, a lottery drawing. In some embodiments, player(s) can utilize the plurality of methods to supply game data that is typically hand-written on a game coupon (e.g., a lottery coupon/ticket). For example, in accordance with some embodiments of the instant invention, player(s) utilize one or more methods, based at least in part on characteristic(s) of player(s)' voice, to submit game data for a single game (e.g., lottery) entry (e.g., selecting numbers for a lottery entry based at least in part on characteristic(s) of player(s)' voice).

In some embodiments, the instant invention can utilize specifically programmed input device(s) (e.g., Siri interface of Apple iPhone) which receive/recognize players(s)' voice waveform, frequency, tone, pitch, and vocal resonation, and which assist players(s) to select numbers based at least in part on received/recognized characteristic(s) of player(s)' voice (e.g., selecting a first number if player's voice has a first tone and select a second number of player's voice changes to a second tone).

In some embodiments, the instant invention can utilize specifically programmed input device(s) that recognize characteristic(s) of players(s)' voice to ensure certain playing behavior (e.g., policing rules of a personalized game). For example, in some embodiments, the instant invention can utilize specifically programmed input device(s) that recognize characteristic(s) of players(s)' voice to monitor responsible gaming and prohibiting the sale of tickets, and/or produce warning messages, if the a player sounds tired, anxious, drunk, and/or expresses any other measured psychological and/or physiological condition(s) which is recognized as not being favored and/or being prohibited based on rule(s) of the game itself and/or rules of any $3^{rd}$ party(ies) whose rules the game operator desires and/or is obligated to abide by.

For example, some embodiments of the instant invention can utilize principle that, typically, a voice's waveform is a multi-dimensional (e.g., 2 dimensional) representation of a sound. For example, the two dimensions in a waveform display are time and intensity (e.g., the vertical dimension is intensity and the horizontal dimension is time). Typically, the intensity dimension actually displays sound pressure, which is a measure of the tiny variations in air pressure that humans are able to perceive as sound. For example, the greater the change in pressure, the louder the sound that humans hear. For example, intensity and pressure are physical measurements of sound amplitude whilst loudness is a psychological or perceptual measurement. In some embodiments, the variations in air pressure, relative to atmospheric pressure, are very tiny indeed, ranging from $\frac{1}{5,000,000}$ of atmospheric pressure for the sounds humans can just hear to about $\frac{1}{1,000}$ of atmospheric pressure for very loud sounds. Typically, sound intensity is often quoted in deciBels (dB), which is a logarithmic scaling of sound pressure or intensity and approximates the way the ear and brain rescale sound amplitude. In some examples, intensity of some waveforms is recorded/recognized as a simple linear scaling of sound pressure. In some embodiments of the instant invention can rely on one or more of waveforms and source characteristics that results from two types of speech sound source:

i) periodic vibration of the vocal folds resulting in voiced speech, and ii) aperiodic sound produced by turbulence at some constriction in the vocal tract resulting in voiceless speech.

Typically, the above two sound sources are modified by the frequency-selective (filtering) effects of different vocal tract shapes to produce the various sounds of speech. In some examples, the voiced source can be filtered ("modulated") by the position of the tongue, lips and/or velum to produce all of the vowels as well as the various voiced consonants. In some examples, the aperiodic sources can be filtered to produce various unvoiced speech sounds based on the position of the constriction that produces the turbulence. In some examples, speech sounds result from the mixture of both voiced and unvoiced sounds resulting in, for example, voiced fricatives.

In some embodiments, the instant invention can combine inputs of a portion of game data based on characteristic(s) of the voice with another portion of game data obtained by other input methods (e.g., player writes game information (e.g., numbers on a piece of paper or pad and an input device utilizes an Optical Character Recognition technology(ies) (OCR) to acquire/receive the written portion of game data).

2. Examples Related to Computer-Implemented Methods for Selection of Game Data (e.g., Numbers for a Lottery Entry) for Player(s) Based on Numerous Permutations of Player(s)' Predetermined and/or Ad Hoc Selected Source(s) of Data and Predetermined and/or Ad Hoc Defined Rule(s)

In some embodiments, the instant invention utilizes computer-implemented methods to allow player(s) to select game data (e.g., numbers for a lottery entry) based at least in part on numerous permutations of player(s)' predetermined and/or ad hoc selected source(s) of data and predetermined and/or ad hoc defined rule(s). For example, the inventive systems of the instant invention can be programmed to assist player(s) in a so-called Quick Pick number generation in Quick Pick-type lottery games.

For example, player(s) can predetermine and/or ad hoc select numerous source(s) of data which the programmed computer systems of the instant invention will utilize to select numbers for playing lottery games. For example, player(s) can predetermine and/or ad hoc identify at least one of the following source(s) of so-called "real world" and/or physical data:

1) meteorological measurement(s) (e.g., in a user/player-specified location (e.g., hometown, current location, arbitrary location based on a rule set by player(s)); meteorological measurement(s) may measure, but are not limited to: temperature, humidity, wind speed, sun index, etc.; meteorological measurement(s) may be expressed in actual values (e.g., current temperature, temperature at 10 PM yesterday, etc), statistical values (min, max, average, median and others measured over a predetermined and/or ad hoc period of time), or both;

2) sports-related input(s); for example, but are not limited to: minutes in which events occur in specific match(es), match(es) of favorite team(s), numbers of sportspersons of a particular team that are involved in specific event(s) (e.g., who scores, who starts the match, who is substituted, etc.), score(s) in specific match(es), score(s) in specific period(s) of time during sport event(s), any similarly suitable statistics about a sporting event, a sportsperson or both;

3) location-based information generated/acquired from the player(s) phone and/or other portable device (e.g., GPS location, movements, GPS location of favorite spot(s), most visited spot(s), spots where an even like a hotel/transportation check-in occurred, etc.);

4) financial transaction(s)/value(s) (e.g., exchange rate(s) for predetermined currency(ies), price(s) of stock(s), futures indexes, market indexes (e.g., S&P500);

5) suitable statistics gathered about player(s) everyday activity(ies) (e.g., phone-based statistics (e.g., number of calls/emails/SMSs/social media messages (e.g., retweets) sent/received during a predetermined time period;

6) suitable statistics based at least in part on association between, for example, the phone-based statistics with birthday information for respective contact(s):

7) suitable permutation of two or more of the above data sources; and 8) etc.

In some embodiments, the instant invention allows player(s) to predetermine and/or identify on ad hoc basis at least one rule for each source of data. In some embodiments, the instant invention randomly generates game data from particular source(s) of data. In some embodiments, the instant invention generates game data based on combination of random generation and at least one rule that is predetermined or identified on ad hoc basis by player(s).

In some embodiments, the programmed systems of the instant invention allow player(s) to rank and/or automatically ranks player(s)' preferences for source(s) of data to be utilized for the game data and/or player(s)' rules on how to manipulate/utilize data to come up with the game data.

3. Examples Related to Computer-Implemented Methods for Autonomous Selection of Game Data (e.g., Numbers for a Lottery Entry) and/or Autonomous Playing Games(s) Based on Predetermined and/or Ad Hoc Flexible Rules In some embodiments, the instant invention player(s) to utilize autonomous computer programs/modules to autonomously perform at least one game related activity or all game related activity(ies) on behalf of player(s) after they set one or more rules that govern the autonomous action(s). In some embodiments, the autonomous computer programs/modules of the instant invention can be an Internet bot, also known as web robot, WWW robot or simply bot, which is a software application that runs automated tasks over the Internet. Typically, bots perform tasks that are both simple and structurally repetitive, at a much higher rate than would be possible for a human alone. In some embodiments, the autonomous computer programs/modules of the instant invention behave in accordance with business rule(s) which are set by player(s) in order to perform an automated action (e.g., a rule directing a software to automatically purchase a coupon for a personalized game (e.g., a Quick Draw lottery ticket) on behalf of player(s) when all the prerequisite conditions of the set rule(s) are satisfied. For example, in some embodiments, the autonomous computer programs/modules of the instant invention can be programmed by players in accordance with at least one of the following parameters:

Applicability: allowing player(s) to: select one or more games to which the rules apply, select period(s) of active time, select payment condition(s) (e.g., e-wallet content test—e.g., purchase I coupon if e-wallet had 5 dollar, and purchase 5 coupons if e-wallet has 20 dollars), select data sources/conditions/rules (e.g., player(s)' own past results, game's historical statistics (e.g., last draw, statistics, statistics over a period of time, etc.);

Qualification: allowing player(s) to select when the rule should be applied—e.g., in every new draw, every other draw, once a month, when jackpot is above or below a threshold, when there was no winner in the previous draw, etc.;

Action: allowing player(s) to select action(s) to be performed—e.g., play all coupons, play some coupons based, for example, on whether coupon(s) include(s) player(s)' favorite numbers, whether the coupons are saved coupons, whether the coupons include previous draw numbers, whether the coupons are quick picks either totally random based on a random numerical generator (RNG) or produced in accordance with principles of the instant invention as, for example, detailed in examples of the second type above.

Limits: allowing player(s) to define how much money should be spent, or how many columns should be submitted, etc.;

Additional rule(s): for example, allowing player(s) to define multi-fold activities such as:

1) when player(s)' quick pick strategy(ies) result in a list of, for example, 10 coupons/tickets, and the purchasing limit is set to play automatically only 5 coupons/tickets 2) the programmed software robot stores the remaining 5 unused coupons/tickets in player(s)' account or a wishlist-type of structure for future use such as in accordance with principles of the instant invention as, for example, further detailed.

Links to loyalty system of other promotions: allowing player(s) to set condition(s) that, for example, result in the programmed software robot(s) applying for promotions when specific conditions from player(s)'s loyalty account are valid and/or link to a specific promotion.

The below example illustrates how player(s) can define more and more complex rules by setting additional conditions that the programmed software robot(s) must follow:

Rule #1: If the jackpot for the next draw of powerball is above $10 Million, then play 3 quick pick selections for me for the next draw;

Rule #2: If the jackpot for the next draw of powerball is above $10 Million, then create a list of quickpicks based on my quick pick preferences (setting relevant to no. 2 above) and then select at random to play them up to a maximum of 50% of my wallet account balance if that is above $30 or with no maximum if my wallet account balance is below that amount;

Rule #3: If the jackpot for the next draw of powerball is above $10 Million OR if my account balance is above $30 OR if I had any winnings from this game in the last draw THEN play first my favourite coupons and then a number of quick picks up to a total of $30;

Rule #4: If I have won less than $20 in the previous powerball draw then spend all of it in the next draw to buy quick picks unless my total wallet balance is less than $50;

Rule #5: If I am about to lose my VIP loyalty tier status, and I can spend a maximum of $50 to retain that, then, for example, buy coupons up to the minimum required amount:

Etc.

In some embodiments, the instant invention allows player(s) set numerous programmed software robots that would each act either independent and/or in cooperation with one or more other programmed software robot(s) of the same player(s) and/or other player(s) (i.e., botnet-type of interaction).

4. Examples Related to a Wishlist and Playing for Someone Else (e.g., Gift Coupons/Tickets, Etc.)

In some embodiments, rule(s) and/or programmed software robot(s) specified by first player(s) generate(s) potential coupons/tickets for entry in each draw. In some embodiments, other predefined potential entries are first player(s)' favorite numbers and/or favorite coupons/tickets. In some embodiments, all first payer(s)' defined combinations result in a list of potential coupons/tickets to be played by first player(s). In some embodiments, first player(s) pay(s) and play(s) a portion of coupons/tickets from the list of potential coupons/tickets (i.e., first player(s) submit(s) some coupons/tickets to the draw based on either automatic or manual selection).

In some embodiments, any unplaced remainder of coupons/tickets becomes a wishlist. In some embodiments, this wishlist can be accessible to other second player(s) such as, but are not limited to, friends, which can be defined, by player(s) and/or the programmed systems of the instant invention to be such, based at least in part on an internal relationship (e.g., like friends from a lottery website) and/or an external relationship (e.g., like friends from facebook), email contacts, etc. In some embodiments, these other second player(s) then have an option to manually and/or based on an automatically programmed robot to pay to play those unused coupons/tickets on the first player(s)' behalf (i.e., these other second player(s) will be gifting the reminder of unused coupons/tickets to first player(s) from first player(s)' wish list). In some embodiments, the instant invention can allow to the first player(s), the second player(s), a game conducting operator, or any combination thereof, to establish, for example, whether the second player(s) pay the full amount or not for the reminder of unused coupons/tickets, whether the second player(s) also win something or share winnings, etc.

5. Examples Related to Collaborative Coupon/Ticket Creation

In some embodiments, the instant invention allows players to create/generate game data (e.g., jointly come up with numbers for a lottery coupon/ticket) to play jointly either by providing numbers to someone submitting the game data (e.g., coupon/ticket) and/or by, for example, giving collaborators an incomplete game data (e.g., incomplete coupon/ticket) to complete and submit.

For example, in some embodiments, the instant invention allows players to collaborate with other through their accounts with a personalized game (e.g., lottery) operator in at least one of the following ways, but are not limited to:

1) incomplete game data (e.g., coupons/tickets) for joint submission can be generated manually and shared with other players;

2) incomplete game data (e.g., coupons/tickets) can also be generated based on programmed robots of the instant invention and sent via predetermined means of sharing, such as, but are not limited to, email, NFC, bluetooth, instant messaging, etc.;

3) a recipient of incomplete game data (e.g., coupons/tickets) can also have the programmed robots of the instant invention and automated rules in place to complete the game data and submit with or without manual control (e.g., if any of my close friends send an incomplete coupon then complete it at random and submit or pass on to the next one on the list provided that the cost for me will not exceed $5 for this application of the rule and S10 in total from this rule and this draw).

5. Examples Related to Game Data Wizards Linked with the Programmed Robots of the Instant Invention In some embodiments, the instant invention allows player(s) to utilize complex statistical filters to create potential game data (e.g., potential coupon/tickets entry(ies) for next week's draws, etc).

In one example, the statistical filters can be utilized to create potential coupons/columns in playing a lottery game, as follows:

1) Start with all potential combinations of the game
2) Exclude any number appearing in the last two draws
3) Exclude any column that:
Has more than 2 consecutive numbers
Has more than X odd numbers (same for even)
Has more than 3 numbers from the same decade
Has more than 3 numbers ending in the same digit.

In another example, the statistical filters can operate as described below.

In some embodiments, the statistical filters can be based on statistical tables. An exemplary filter first calculates the statistics of selected past draws (e.g., Expert Lotto 6/49 Demo Lottery) and then accepts only tickets that have desired values in selected column(s) in statistical table.

A player, for example, chooses past winning numbers draws to calculate draw interval statistics from. The player then selects which statistical property the filter will evaluate. The player then selects desired statistical table column(s) in Table 1 and the required value or value range the accepted tickets must have. The player can add additional condition. The player can then select an option Match all of the following to make the filter accept only tickets that meet all the conditions listed in the table. The player can then select an option Match any of the following makes the filter accept tickets that meet at least one of the listed conditions. The player can then add another filtering option: Applies to X to Y in each ticket. That is because when filtering e.g. according to statistics of ticket numbers then each accepted ticket can contain up to 6 numbers that the filter's statistical condition(s) pull from the whole number pool (in a 6/xx lottery).

The conditions in Statistical Filter look like this:
StatisticalTableColumnName Operator NumericalValue
Where the StatisticalTableColumnName is one of:

Occurrence—how many times a given statistical property value has been found in analyzed past draws. For example pool number 6 has been found 3 times in ten latest draws.

Occurrence Percentage—the same value as Occurrence but it is given as a percentage of all occurrences.

Latest—how many draws elapsed since the last occurrence of a given statistical property. For example number 11 has been last drawn 8 draws ago. While number 23 came up in the very latest draw so its corresponding value in Latest column in statistical table is 1.

AVG Interval—average count of draws that elapsed between two following occurrences of a given statistical property value in analyzed past draws. For example average interval 4 of pool number 6 means that number 6 hits on average in every fourth draw.

Min Interval—the lowest count of draws that elapsed between two following occurrences of a given statistical property value in analyzed past draws. For example minimum interval of 3 of pool number 23 means that the number hit again after two draws at the earliest. While minimum interval of 1 of pool number 11 means that the number hit again in the very next draw since its previous occurrence.

Max Interval—the highest count of draws that elapsed between two following occurrences of a given statistical property value in analyzed past draws. For example maximum interval of 5 of pool number 6 means that the longest delay between two following hits of that number is 5 draws.

Due—statistical probability that a given property will hit in the next draw. Due values lower than 1 mean that the given property isn't expected in the next draw. Due value higher than 1 mean that the given property is long overdue and should hit in the next draw. Due values close to 1 mean that the given property is very close to its average hit cycle and should come up in the next draw. For example Due value of 6.00 of pool number 30 means that the number is long overdue because on average it hits in every draw and now hasn't come up in six latest draws (applies to the 10 latest draws in Expert Lotto 6/49 Demo Lottery).

TABLE 1

| Operator | Example | Meaning |
|---|---|---|
| = | Ticket Numbers: Occurrence = 5 | Select pool numbers that appear exactly 5 times in the selected past draws. |
| > | Triplets: Latest > 4 | Select triplets that haven't hit for more than 4 draws in the selected past draws. |
| >= | Pairs: Occurrence >= 3 | Select pairs that appear 3 or more times in the selected past draws. |
| < | Ticket Numbers: Latest < 3 | Select pool numbers that hit in the very latest, draw or in previous draw in the selected past draws. |
| <= | Pairs: Due <= 0.8 | Select pairs that are not likely to hit again in the next draw. |
| Highest | Ticket Numbers: Latest Highest 5 | Select 5 ranks of pool numbers that haven't hit for the longest time in the selected past draws |
| Lowest | Ticket Numbers: Due Lowest 10 | Select 10 ranks of pool numbers that are least likely to hit in the next draw. |

Operators Highest and Lowest select the best and the worst ranking property values. A rank consists of statistical property values that have the same value in given statistical table column. For example when analyzing 10 latest draws in Expert Lotto 6/49 Demo Lottery then the Latest column in Ticket Numbers table sorted in descending order as shown in Table 2.

TABLE 2

| Main Number | Latest |
|---|---|
| 5 | 10 |
| 31 | 10 |
| 43 | 10 |
| 38 | 9 |
| 11 | 8 |
| 8 | 8 |
| 26 | 8 |
| 48 | 8 |
| 49 | 8 |
| 20 | 7 |
| 33 | 7 |
| 35 | 7 |
| 30 | 6 |
| 15 | 6 |
| 37 | 6 |
| 32 | 5 |
| 1 | 5 |
| 12 | 5 |
| 24 | 5 |
| more . . . | more . . . |

The highest ranking numbers are the ones with Latest value of 10 (5, 31, 43), the second best rank is number 39 with Latest value of 9, the third best rank are numbers with Latest value of 8 (11, 8, 26, 48, 49) etc. So filter condition Ticket Numbers: Latest Highest 3 will select pool numbers with Latest values 10, 9 and 8, the numbers are 5, 31, 43, 38, 11, 8, 26, 48, 49. Filter condition Ticket Numbers: Latest Highest I will select pool numbers 5, 31, 43—not just the first row of statistical table sorted in descending order. Operator Lowest works the same way except that it looks at the lowest ranking of numbers, i.e. at the bottom of Table 2.

In some embodiments, the instant invention can utilize any other suitable statistical game/lottery filter as a first step for the player(s) to create a potential pool of game data (e.g., possible columns to enter) and then apply filters which are personal to the player(s) and relevant to the rules/preferences that player(s) set for the programmed robots of the instant invention (e.g., the quick pick rules they defined in their accounts with a game/lottery operator). For example, in some embodiments, the instant invention allows the player to set the following:

Take the columns pool generated by personal statistical filters and then:
- Exclude all columns that contain player's unlucky numbers (e.g., a number 13);
- Only use columns that contain numbers generated by any quick pick selection the player set (e.g., player's favorite number(s), player's GPS location, etc.);
- Exclude any column that does not contain at least 4 of the numbers in player's favorites and quick pick rules; and
- Exclude any columns where 3 or more numbers are the same or different to the coupons/tickets that player played in the last 3 months.

In some embodiments, the player may desire to further filter results utilizing a personal RNG input randomizer to make further selection. For example, if all player's rules result in a pool of 100 coupons/tickets and the player only desires to play 10 coupons/tickets, then, the instant invention allows the player to delegate to the programmed system of the instant invention to choose 10 coupons/tickets for the player, using, for example: a current time of the player's portable electronic device, player's age in seconds, player's current location coordinates, —as pseudo-randomizer.

Illustrative Functionalities of Exemplary Computer Specialized Game Interfaces Programmed in Accordance with the Instant Invention View Splash Screen Splash Screen refers to the presentation of the mobile application logo and operator branding.

View Walkthroughs

Walkthroughs refer to a set of consecutive screens that present and highlight the main key features of the mobile application. The goal of walkthroughs is to educate users on main application functionalities and create an engaging first impression of the application.

Register

Registration refers to the process, which is followed by a user in order to register to the service and get eligible to use it.

Registration process only refers to custom registration. No social registration is included (i.e. Facebook, Twitter, Google, etc.).

Registration process includes at least two steps:
Simple registration
Extended registration Simple registration includes only the first name, last name, e-mail, username and password of the user, as well as the acceptance of the Terms of Service and Privacy Policy of the mobile lottery application.

Extended registration includes a set of other information including, but not restricted to, gender, date of birth, address, photo.

View Terms of Service

Terms of Service refer to the presentation of the Terms of Service of the mobile lottery application to a user.

View Privacy Policy

Privacy Policy refers to the presentation of the Privacy Policy of the mobile lottery application to a user.

Loin

Login refers to the process, which is followed by a user in order to log in the service and start using it.

Login process only refers to custom login process, similar to the registration process. No social login is included.

Login process includes the insertion of username and password, as well as the option to remember player information for future use (i.e. Remember me option).

Remind/Reset Password

Remind/reset password refers to the process, which is followed by a user in order to retrieve its password.

Remind/reset password process includes the insertion of the e-mail and/or the username of the user in order to send the user a new password or reset the current one.

View Available Games

The mobile lottery application is designed to host and provide a user more than one available game (i.e. Joker. Lotto, etc.). Application structure and navigation will enable end users quickly access all games.

For every available game there are at least two modes available:
Information mode
Live draw mode
Information Mode For every available game at least the following set of information is available:
Countdown to next draw
Jackpot level
Play now (with immediate presentation of draft/saved coupons for even faster gameplay)
Previous results
My Inbox
Information (how to play, etc.)

These options include both presentation of the information and direct links to the respective sections of the mobile application, where a user is able to find more information about each section.

Live Draw Mode

For every available game a set of information is available:
Live draw information (i.e. numbers of current draw)
Matched coupon(s) of user (i.e. the coupon(s) that win based on the current draw)
Jackpot level
Play now (for next draws and with immediate presentation of draft/saved coupons for even faster gameplay)
Previous results
My Inbox
Information (how to play, etc.)

These options include both presentation of the information and direct links to the respective sections of the mobile application, where a user is able to find more information about each section.

View More Application Options

More application options refer to the set of screens, which comprise functionalities available for all games, irrespective of the discrete characteristics of each game.

These options can include at least one of the following:
Manage My Account
Manage Settings
View Stores
Scan Coupon
Information ("About") regarding the application
Social Sharing of the application
Manage My Account The Manage My Account option refers to a set of options, which are used by a user in order to have access to any information is related to him.

These options can include at least one of the following:
Manage Profile Information
View Loyalty
Manage Payments
View History
View Statistics
Manage Favorites
Manage Profile Information Profile information refers to the profile of a user, which was inserted during the registration phase. This information is available both for presentation and editing.

Manage Payments

Payments refer to the available payment options, which are available to a user in order to use for a specific game. Payments are tightly connected to the backend infrastructure of the mobile lottery application and are not included in this specification. In some embodiments, payment options can include, such as, but not limited to, e-wallet, demo (free play) for player acquisition, direct charge to credit/debit or other card, personal bank account, charge on the carrier (e.g., AT&T, Vodafone,) etc.

View Loyalty

Loyalty refers to a set of options, which are available to a user and are related to loyalty schemes that the operator offers to its players. Loyalty is tightly connected to the backend infrastructure and the operator of the mobile lottery application and is not included in this specification.

View History

History refers to the presentation of all transactions that a user has performed via the mobile application.

These transactions are split in the following categories:
Payments (i.e. deposits, etc.)
Account (i.e. last login, etc.)
Coupons (i.e. all played coupons and results, all saved coupons)

For each transaction, a user is able to view extended information.

Options to filter and/or search for a specific transaction are also available.

Main option for filtering is date.

Specifically for the played coupons, a user is able to re-play a coupon.

View Statistics

Statistics refer to the presentation of useful information to the user regarding the past draws and its past coupons. Simple representation of data is included (i.e. not dynamic graphs).

Manage Favorites (e.g., Numbers and/or Coupons)

Favorites refer to the set of options, which are used by a user in order to specify either its favorites numbers in general or a favorite coupon for a specific game.

Manage Settings

Settings refer to the functionality, which is used by a user in order to specify and configure a set of parameters regarding the use and presentation of the mobile application and its available games.

Such settings include (but they are not restricted to):
Language settings
Time and/or Timezone settings
Logout
View Stores View stores refer to the functionality, which is used by a user in order to view and find stores of the operator.

Available options can be (but they are not restricted to):
View current user location
Find store either using user location or searching for a specific address
Select specific store and view store information
Get directions for specific store
Call specific store
Check-in at a specific store
View Information ("About")

Information refers to a set of screens, which present a set of information regarding the mobile lottery application and the available games.

Such information includes (but it is not restricted to):
Game Operator about page
Help page
How-to (i.e. rules, etc.) page
Payments information page
Responsible gaming and limits information page
Loyalty information page
Scan Coupon Scan coupon refers to the process, which can be used by a user to scan a printed coupon in order to check the results.

An option to add a printed coupon to the past coupons of a user after the scanning is also included.

Share Information

Share information refers to the options that are available to a user in order share information about the mobile application and/or a specific game.

These share options include (but they are not restricted to):
E-mail share functionality
Facebook share functionality
Twitter share functionality
SMS share functionality
Google+ share functionality
Play Play refers to the process, which is followed by a user in order to place a set of coupons for a specific game.

For each game, there is a standard set of rules, which must be followed in order to complete the play process. Besides these rules, all games can include, for example, at least one of the following features:
Select column
Pick numbers
  Manual pick
  Random quick pick
  Tilt quick pick
  Favorites (numbers or coupons) quick pick
  Past coupons quick pick
Select next draw and/or consecutive draws (select start date)
Play coupon or issue coupon barcode
Save coupon for later
Present cost of coupon
View Live Draw Live draw refers to the process, which is used to show to the user the numbers of the live draw.

Except the numbers of the live draw, the matched coupons of the user are also presented as well as information about the current jackpot.

View Past Draws

Past draws refer to the presentation of the past results of a draw for a specific game.

Available information for the past results of a draw can include one of more of the following:

Numbers of draw

Distributed prizes

User matched coupons

Options to filter and/or search for a specific draw are also available. These options can include, for example:

Search by date

Search by draw number

Manage Inbox

Inbox refers to a set of options, which are used in order to present a user various alerts about the mobile lottery application and/or the available games.

These alerts can be split into a plurality of the following categories:

Draws & Results

Jackpots

Promotions

Loyalty

A user is able to manage specific parameters for each type of alert (i.e. jackpot level, alarm offset, etc).

In some embodiments, the above described programmed interfaces is utilized to send alerts to a mobile lottery application.

Television

In some embodiments, the inventive system(s) of the present invention is/are configured to provide a distribution channel, where the distribution channel is provided by a smart TV (e.g., Samsung Smart TV), and to provide a feature(s) and/or functionality(s) substantially similar to a mobile lottery application for, e.g., smartphones, tablets, etc. In some embodiments, the inventive system is configured to accept a coupon/ticket from a user, where the coupon/ticket is received from an application on the user's smartphone, where the coupon/ticket is provided to the application dynamically and/or in real time. In some embodiments, the application/smart TV can provide a second screen for the smart TV/application.

Interaction:

In some embodiments, the inventive system(s) of the present invention is/are configured to deliver at least one push notification to a user's mobile device, where the at least one push notification is configured to provide information to the user about a future live draw. In some embodiments, the inventive system(s) is/are configured to deliver a push notification to the user's mobile device to provide information regarding the live draw at the time that the live draw is occurring. In some embodiments, the inventive system(s) is/are configured to provide a user with sufficient information to permit a user enough time to gain access to the TV and the application and to provide the user with a selection criteria, where the selection criteria provides an option to view the live draw. In some embodiments, the inventive system(s) is/are configured to receive a user's selection of the option to view the live draw, and the screen is configured to partition into at least two sections (e.g., 2 sections, 3 sections, 4 sections, 5 sections, etc.). In some embodiments, a first section of the screen (e.g., top, bottom, left, right) is configured to display the live draw of the numbers, and a second section of the screen (e.g., bottom, top, right, left) is configured to display the coupon(s)/ticket(s) provided by the user, where the coupon(s)/ticket(s) is/are specific to the live draw (i.e., game). In some embodiments, the inventive system(s) is/are configured to compare the coupon(s)/ticket(s) to the live draw, recognize the coupon(s)/ticket(s) when a first number is drawn, record any coupon(s) (if any) that contain an identical number to the live draw, display the identical number to the user (e.g., at the top of the TV and/or application screen).

In some embodiments, the inventive system(s) of the present invention is/are configured to provide a push notification message to the user's device, where the user's device is configured to recognize an identical number (e.g., a ticket was identified to be identical to at least one number provided by the live draw) and where the recognition of the identical number has occurred, where the push notification is configured to display a congratulatory message to the user on his winnings. In some embodiments, upon completion of the live draw, the inventive system(s) is/are configured to provide a push notification message to the user, when the user is identified by the inventive system(s) as a winner, where the push notification is configured to deliver a message to the user, where the message displays a congratulatory message (e.g., "Congratulations on your winnings").

Retail Sports

In some embodiments, the inventive system(s) of the present invention is configured to provide(s) a push notification message containing a QR code, where the push notification message provides an invitation to the user, and where the invitation contains information regarding a retail shop(s) (e.g., Sports Authority invites you to have VIP treatment including, e.g., a discount (e.g., 20%)).

In some embodiments, the inventive system(s) of the present invention(s) is/are configured to allow a user to download a mobile lottery application onto a mobile device (e.g., when a user is provided with a QR code on, e.g., a retail shop and/or the user previously downloaded/used the application on the mobile device). In some embodiments, the inventive system(s) is/are configured to provide the user with a push notification (e.g., the push notification containing a QR code) with an invitation to visit at least one retail shop for, e.g., "VIP treatment" (e.g., discounts, personal shopping, prize(s), any additional incentive, or any combination thereof).

Game Setup:

In some embodiments, the inventive system(s) is/are configured to include:

(i) A TV monitor and/or Projector, a processing unit (PC or Laptop) with camera;

(ii) A motion detector sensor; and (iii) A marked position for the user to occupy (e.g., stand/sit) and play.

In some embodiments, the inventive system(s) of the present invention is/are configured to provide the user entry into (i.e., come into contact with) a retail point (e.g., a store, a kiosk, etc.) and the user is provided with a personalized message on the TV inviting him to play the game (e.g., a personalized game focusing on a sports theme). In some embodiments, the inventive system(s) is/are configured to receive a user's scan of the QR code (e.g., the QR code present on the mobile device), and the inventive system(s) is/are configured to provide a message on the TV (e.g., but not limited to, "Take position to play").

In some embodiments, the inventive system(s) is/are configured to provide(s) an animation on the TV, where the animation includes a sports related theme, e.g., a Football Goalpost (e.g., standard size), where the animation is displayed with virtual numbered balls inside the goalpost spread, e.g., randomly or organized. In some embodiments, the inventive system(s) is/are configured to record a user's kick, and depending on the movement of the leg (e.g., motion sensor technology, such as, but not limited to, Microsoft Kinect), virtual ball is configured to move towards the goalpost and the inventive system(s) is/are configured to select a numbered ball. In some embodiments, the inventive system(s) is/are configured to record a plurality of kicks and select a plurality of numbered balls. In some embodiments, a coupon is generated by the selection of the numbered balls depending on the personalized game (e.g., lottery game). In some embodiments, the completed coupon can be: (1) received as a submission to the Lottery machines (e.g., directly) waiting for the user to go to the retailer to pay in cash, and/or (2) the completed coupon can be sent as a push notification containing a QR code to the user. In some embodiments, the push notification can be configured to be (1) scanned and received by the retail shop upon submitting the coupon, and/or (2) provide direct electronic playing from the mobile device.

In some embodiments, the inventive system(s) of the present invention provide a personalized game to the user, where the personalized game can be chosen from, but are not limited to, the following games: basketball, tennis, rugby, American football, golf, swimming/aquatics, curling, soccer, lacrosse, skiing (alpine and cross-country), cycling, volleyball, archery, badminton, boxing, judo, rowing, shooting, table tennis, weightlifting, etc.). In some embodiments, each player is assigned a score based on specific rules of the personalized game (e.g. speed of a ball, skill level to reach the corners of the goalpost, numbers selected, secret magic red ball multiplier, etc.). In some embodiments, this score is displayed on the TV screen at all times, and is configured to serve as a ranking (e.g., "Top Players Ranking Score") for a plurality of users. In some embodiments, the ranking is configured to provide gifts at predefined periods; for example, the inventive system(s) is/are configured to identify when a user is outpaced by another player in the retail shop, and the inventive system(s) is/are configured to then provide the user with an alert to visit the retail shop and play again by submitting another ticket to defend his top position title to claim a possible prize.

Illustrative Operating Environments

In some embodiments, the innovative programmed systems can be operated over other operating systems, such as, but not limited to, iOS and Android. In some embodiments, the innovative programmed systems can be native to a software platform and/or incorporate programming modules based at least in part on HTML5-based tools like PhoneGap or Sencha. In some embodiments, the innovative programmed systems can include modules that are programmed to provide intelligent dynamic promotion and advertising, mobile payments, augmented reality, etc.

FIG. 1 illustrates one embodiment of an environment in which the present invention may operate. However, not all of these components may be required to practice the invention, and variations in the arrangement and type of the components may be made without departing from the spirit or scope of the invention. In some embodiment, the inventive system for conducting a personalized game hosts a large number of members (e.g., at least 1,000, at least 10,000; at least 100,000; at least 1,000.000) and/or concurrent transactions (e.g., at least 1,000; at least 10,000; at least 100,000; at least 1,000,000). In other embodiments, the inventive system for conducting a personalized game is based on a scalable computer and network architecture that incorporates varies strategies for assessing the data, caching, searching, and database connection pooling. An example of the scalable architecture is an architecture that is capable of operating multiple servers.

In embodiments, members of the inventive computer system 102-104 (e.g. user (e.g. players, agents, etc.) include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, client devices 102-104 are any device that is capable of connecting using a wired or wireless communication medium such as a PDA, POCKET PC, wearable computer, and any other device that is equipped to communicate over a wired and/or wireless communication medium.

In embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like. In embodiments, the invention is programmed in either Java or .Net.

In embodiments, member devices 102-104 may be further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In embodiments, network 105 may be configured to couple one computing device to another computing device to enable them to communicate. In embodiments, network 105 may be enabled to employ any form of computer readable media for communicating information from one electronic device to another. Also, in embodiments, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, network 105 includes any communication method by which information may travel between client devices 102-104, and servers 106 and 107.

Figure 2:
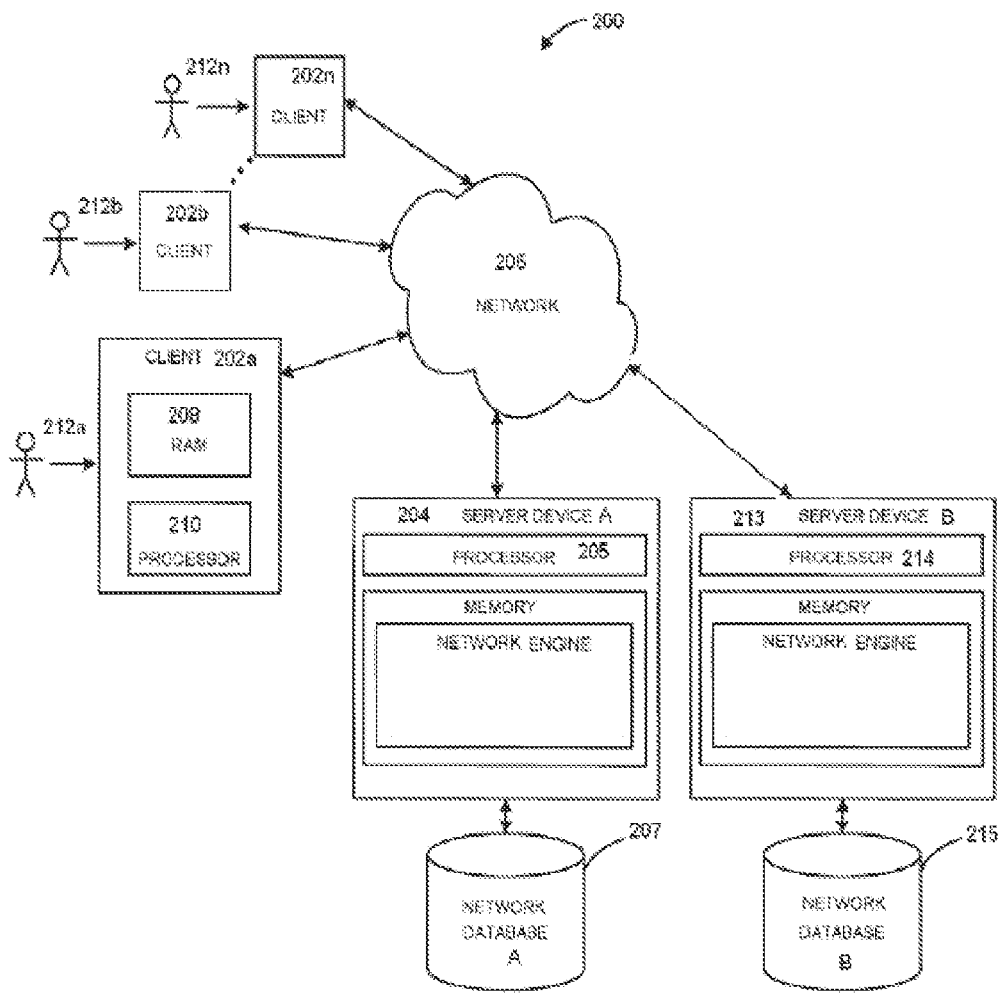
FIG. 2 illustrates some embodiments of the inventive system of the present invention, showing a computer and network architecture that supports the inventive system.

FIG. 2 shows another exemplary embodiment of the computer and network architecture that supports the inventive system for conducting a personalized game. The member devices 202a, 202b thru 202n shown (e.g., lottery terminals, players' personal electronic devices) each at least includes a computer-readable medium, such as a random access memory (RAM) 208 coupled to a processor 210 or FLASH memory. The processor 210 may execute computer-executable program instructions stored in memory 208. Such processors comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media may include, but are not limited to, an electronic, optical, magnetic, or other storage or transmission device capable of providing a processor, such as the processor 210 of client 202a, with computer-readable instructions. Other examples of suitable media may include, but are not limited to, a floppy disk, CD-ROM, DVD, magnetic disk, memory chip. ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python. Perl, and JavaScript.

Member devices 202a-n may also comprise a number of external or internal devices such as a mouse, a CD-ROM, DVD, a keyboard, a display, or other input or output devices. Examples of client devices 202a-n may be personal computers, digital assistants, personal digital assistants, cellular phones, mobile phones, smart phones, pagers, digital tablets, laptop computers, Internet appliances, and other processor-based devices. In general, a client device 202a are be any type of processor-based platform that is connected to a network 206 and that interacts with one or more application programs. Client devices 202a-n may operate on any operating system capable of supporting a browser or browser-enabled application, such as Microsoft™, Windows™, or Linux. The client devices 202a-n shown may include, for example, personal computers executing a browser application program such as Microsoft Corporation's Internet Explorer™, Apple Computer. Inc.'s Safari™. Mozilla Firefox, and Opera. Through the client devices 202a-n, users (e.g. players, agents, etc.) 212a-n communicate over the network 206 with each other and with other systems and devices coupled to the network 206. As shown in FIG. 2, server devices 204 and 213 may be also coupled to the network 206.

In some embodiments, the term "mobile electronic device" may refer to any portable electronic device that may or may not be enabled with location tracking functionality. For example, a mobile electronic device can include, but is not limited to, a mobile phone, Personal Digital Assistant (PDA), Blackberry™, Pager, Smartphone, or any other reasonable mobile electronic device. For ease, at times the above variations are not listed or are only partially listed, this is in no way meant to be a limitation.

In some embodiments, the terms "proximity detection," "locating," "location data," "location information," and "location tracking" as used herein may refer to any form of location tracking technology or locating method that can be used to provide a location of a mobile electronic device, such as, but not limited to, at least one of location information manually input by a user, such as, but not limited to entering the city, town, municipality, zip code, area code, cross streets, or by any other reasonable entry to determine a geographical area; Global Positions Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation. Angle of arrival (AOA) based triangulation; techniques and systems using a geographic coordinate system such as, but not limited to, longitudinal and latitudinal based, geodesic height based, cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed, this is in no way meant to be a limitation.

In some embodiments, NFC can represent a short-range wireless communications technology in which NFC-enabled devices are "swiped," "bumped," "tap" or otherwise moved in close proximity to communicate. In some embodiments, NFC could include a set of short-range wireless technologies, typically requiring a distance of 10 cm or less.

In some embodiment, NFC can operates at 13.56 MHz on ISO/TEC 18000-3 air interface and at rates ranging from 106 kbit/s to 424 kbit/s. In some embodiments, NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, NFC peer-to-peer communication can be conducted when a plurality of NFC-enable device within close proximity of each other.

In some embodiments, NFC tags can contain data and be read-only or rewriteable. In some embodiment, NFC tags can be custom-encoded. In some embodiments.

NFC tags and/or NFC-enabled device (e.g., smart phones with NFC capabilities) can securely store personal data such as debit and credit card information, loyalty program data. PINs and networking contacts, among other information.

In some embodiments, lottery data may also be communicated using any wireless means of communication, such as 4G, 3G. GSM, GPRS, WiFi, WiMax, and other remote local or remote wireless communication using information obtained via the interfacing of a wireless NFC enabled mobile device to a smart poster. In some embodiments, the term "wireless communications" includes communications conducted at ISO 14443 and ISO 18092 interfaces. In some embodiments, the communications between player's NFC-enabled smart device and lottery provided equipment (e.g., terminals, POS, POE, Hosts) is performed, for example, in accordance with the ISO 14443A/B standard and/or the ISO 18092 standard.

In some embodiments, player's NFC-enabled smart device and/or lottery provided equipment (e.g., terminals, POS, POE, Hosts) can include one or more additional transceivers (e.g., radio, Bluetooth, and/or WiFi transceivers) and associated antennas, and enabled to communicate with each other by way of one or more mobile and/or wireless protocols.

In some embodiments, NFC tags can include one or more integrated circuits.

In some embodiments, player's NFC-enabled smart device may include a cellular transceiver coupled to the processor and receiving a cellular network timing signal. In some embodiments, player's NFC-enabled smart device may further include a satellite positioning receiver coupled to the processor and receiving a satellite positioning system timing signal, and the processor may accordingly be configured to synchronize the internal timing signal to the satellite positioning system timing signal as the external timing signal. In some embodiments, the processor of player's NFC-enabled smart device may be configured to synchronize the internal timing signal to the common external system timing signal via the NFC circuit.

In some embodiments, player's NFC-enabled smart device may include a power source, an NFC circuit configured to wirelessly communicate using an NFC communications protocol, and a processor coupled to the power source and the NFC circuit.

In some embodiments, the processor of player's NFC-enabled smart device may be configured to synchronize an internal timing signal to an external timing signal, cycle power to the NFC circuit to periodically switch the NFC circuit between a peer-to-peer recognition state and a low power state based upon the synchronized internal timing signal, and initiate peer-to-peer NFC communications with another NFC device when in range thereof and upon being simultaneously switched to the peer-to-peer recognition state therewith.

In some embodiments, player's NFC-enabled smart device may include a related physical computer-readable medium and may have computer-executable instructions for causing player's NFC-enabled smart device to initiating peer-to-peer NFC communications with another NFC device when in range thereof and upon being simultaneously switched to the peer-to-peer recognition state therewith.

In some embodiments, the processor of player's NFC-enabled smart device may be configured for communicating wireless voice and data via a cellular transceiver via a cellular communications network By way of example, the data communications may include, but not limited to, email messages, Web data, etc. In some embodiments, player's NFC-enabled smart device may in addition (or instead) include other types of wireless communications circuits capable of transmitting voice or other data, such as a wireless LAN, WiMAX, etc., circuit. In some embodiments, the processor of player's NFC-enabled smart device may proceed directly to communicate with the trusted NFC device, and in the case of a "smart poster" NFC device (e.g., SLP/SLS), such as one configured to pass a Uniform Resource Locator (URL), the processor may automatically direct a browser application thereof to the URL without prompting for permission to proceed to the designated location.

Illustrative Examples for Conducting and Participating in Lottery Games

Example 1

In some embodiments, lottery games of the present invention are conducted utilizing NFC devices that can include, but are not limited to, one or more Smart Lottery Poster (SLP) or a Smart Lottery Spot ("SLS") having one or more wireless tags ("NFC tags"). In some embodiments, NFC tagged spots (SLP, SLS) can be in one or more of the following formats or other: wall posters, street posters, POS (point of service locations), terminals, newspapers, magazines, NFC-enabled TV, etc.

In some embodiments, players' NFC-enabled devices selectively recognize only certain NFC tagged spots (SLP, SLS or other NFC-tagged spots in cooperation with the Lottery Host) and disregard others (e.g., NFC tagged spots belonging to a particular retailer).

In some embodiments, NFC taps location must be known by the lottery host system.

In some embodiments, players' NFC-enabled devices must be enabled for mobile client tracking.

In some embodiments, one or more NFC tags can be arranged on a SLP in a particular grid arrangement. In some embodiments, the NFC tags can be overlaid with an artistic drawing, so that, for example, on top of each tag one corresponding lottery game indicia, e.g. number, is shown. In some embodiments, each NFC tag can be assigned the lottery indicia, e.g. shown over it on the overlay. In some embodiments, the NFC tags (and therefore their respective indicia, e.g. numbers) can be arranged in an orderly manner on the grid, for example following a numeric order.

In some embodiments, a potential player of lottery, who owns an NFC-enabled personal device (mobile phone, PDA, tablet etc) and wishes to participate in a lottery game, can walk up to a NFC spot, e.g. SLP, and select their lottery participation options by bringing the NFC device in a proximity to (or tap on) the desired indicia. e.g. number(s), on the SLP, one by one. In some embodiments, this action can be repeated for as many indicia, e.g. numbers, as desired. In some embodiments, during the process of communicating with the SLS, the NFC-enabled device will interrogate for the proximity of an NFC tag, and, if a tag is detected, the tag is interrogated about its number assignment. In some embodiments, the NFC tag can respond with a lottery indicia, e.g. number, assigned to it and the device can store the tag responses (and therefore the player selections) using a software programmed to receive and communicate information utilizing NFC protocols. In some embodiments, a set of selected numbers can be used to create an electronic lottery play slip which can then be transferred to a lottery conducting agency for validation, using, for example, an electronic message, or a barcode formed on the device screen, or any other suitable technologies.

The present invention is explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Figure 3:
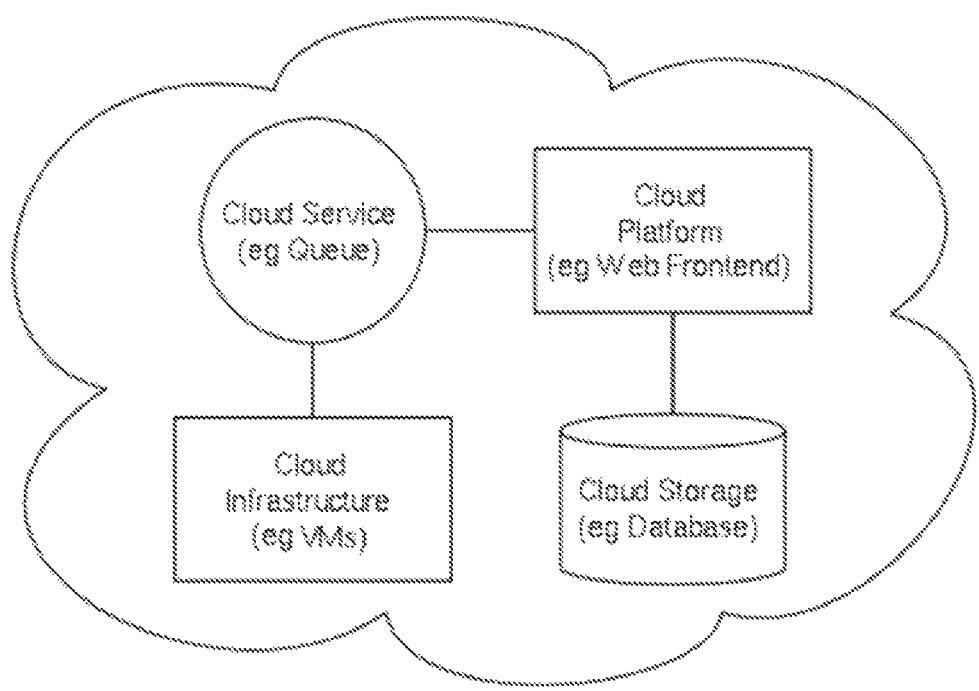
FIG. 3 illustrates some embodiments of the inventive system of the present invention, showing a cloud system supporting the inventive system.
Figure 4:
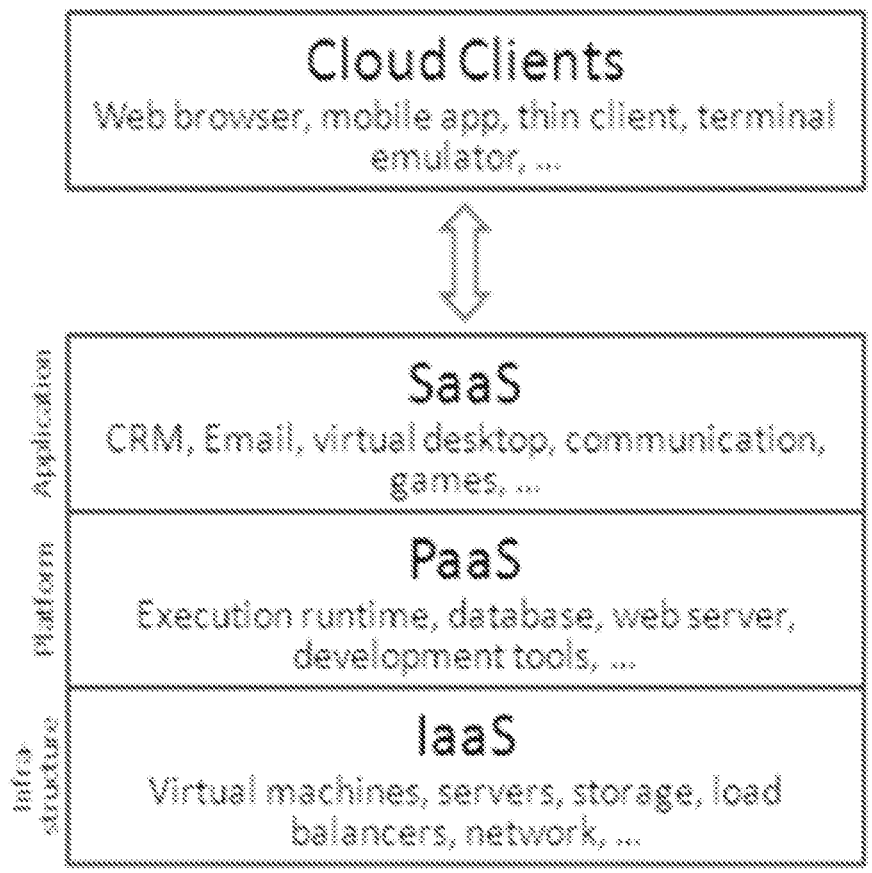
FIG. 4 illustrates some embodiments of the inventive system of the present invention, showing the cloud systems supporting the inventive system and allowing a delivering and receiving of information to and/or from cloud clients.

For purposes of the instant description, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). In some embodiments, the instant invention offers/manages the cloud computing/architecture as, but not limiting to: infrastructure a service (IaaS), platform as a service (PaaS), and software as a service (SaaS). FIGS. 3 and 4 illustrate schematics of exemplary implementations of the cloud computing/architecture.

Of note, the embodiments described herein may, of course, be implemented using any appropriate computer system hardware and/or computer system software. In this regard, those of ordinary skill in the art are well versed in the type of computer hardware that may be used (e.g., a mainframe, a mini-computer, a personal computer ("PC"), a network (e.g., an intranet and/or the internet)), the type of computer programming techniques that may be used (e.g., object oriented programming), and the type of computer programming languages that may be used (e.g., C++, Basic, AJAX, Javascript). The aforementioned examples are, of course, illustrative and not restrictive.

In some embodiments, the instant invention provides for a computer system, including: a) at least one server and software stored on a computer readable medium accessible by the at least one server; where the software is at least configured to: i) generate, in real-time, game data of at least one personalized game based, at least in part, on at least one data source, where the at least one data source is identified by at least one user, where the at least one data source includes values corresponding to at least one of the following parameters: 1) at least one meteorological condition of at least one particular locality, 2) at least one sports-related statistic, 3) at least one geographic descriptors, 4) at least one financial statistic, 5) at least one statistic regarding at least one activity of the at least one user, being derived from a personal portable computer device of the at least one user, 6) at least one statistic regarding information being stored on the personal portable computing device of the at least one user, or 7) any combination thereof; ii) receive, in real-time, game input from the at least one user to play the at least one personalized game, iii) determine, in real-time, an outcome of playing the at least one personalized game by the at least one user, and iv) output, in real-time, the outcome of playing the at least one personalized game to the at least one user; b) at least one database accessible by the at least one server and is configured to store the game data of the at least one personalized game; c) a plurality of specifically programmed input devices, where each specifically programmed input device is configured to: 1) receive, in real-time, a vocal input from at least one user; 2) dynamically determine, in real-time, at least one voice characteristic of the vocal input from the at least one user, based, at least in part, on at least one of: (i) a duration of the vocal input time, and (ii) an intensity of at least one waveform, where the intensity of at least one waveform is calculated based, at least in part, on at least one of: (1) a periodic vibration of vocal folds of the at least one user, and (2) an aperiodic sound produced by turbulence at a constriction in a vocal tract of the at least one user; 3) dynamically determine, in real-time, at least one first game entry for the at least one personalized game, based, at least in part, on the at least one voice characteristic of the vocal input of the at least one user; 4) receive, in real-time, non-vocal input from the at least one user, 5) dynamically determine, in real-time, at least one second game entry for the at least one personalized game, based, at least in part, on the non-vocal input of the at least one user; 6) where the at least one first game entry, the at least one second game entry, or both identify the at least one data source for the at least one personalized game being generated by the software of the at least one server; where the at least one server, the at least one database and the plurality of specifically programmed input devices are connected through a computer network; where the plurality of specifically programmed input devices are at least a thousand of specifically programmed input devices; and where the at least one server is configured to manage, in real-time, the at least a thousand of specifically programmed input devices.

In some embodiments, the at least one personalized game is a lottery game. In some embodiments, the specifically programmed input device is a personal portable computing device.

In some embodiments, the at least one server is further configured to: determine at least one well-being condition of the at least one user based, at least in part, on the at least one voice characteristic of the vocal input of the at least one user, wherein the at least one well-being condition is a condition selected from the group consisting of: tiredness, anxiety, intoxication, a measurable psychological condition, a measurable physiological condition, or any combination thereof; determine an ability of the at least one user to play the at least one personalized game based, at least in part, on the at least one well-being condition of the at least one user, and deliver at least one alert to the at least one user based, at least in part, on the ability of the at least one user to play the at least one personalized game being determined from the at least one well-being condition of the at least one user.

In some embodiments, the at least one server is further configured to terminate the at least one personalized game when the at least one well-being condition is a condition selected from the group consisting of: tiredness, anxiety, intoxication, a measurable psychological condition, a measurable physiological condition, or any combination thereof.

In some embodiments, each specifically programmed input device is further configured to: a) receive at least one payment parameter from the at least one user, and b) obtain at least one payment based on the at least one payment parameter being received from the at least one user.

In some embodiments, the at least one payment parameter includes at least one instruction to play the at least one personalized game when a predetermined threshold set by the at least one user is reached, where the predetermined threshold identifies at least one of: a predetermined prize amount, a predetermined wallet balance, a predetermined period of time elapsed since a previous game, or any combination thereof.

In some embodiments, the at least one server is further configured to combine the at least one first game entry, the at least one second game entry, or both, with at least one third game entry being received from at least one other user to play the at least one personalized game of the at least one user.

In some embodiments, the instant invention provides for a computer method that includes: a) generating, by software, in real-time, game data of at least one personalized game based, at least in part, on at least one data source, where the at least one data source is identified by at least one user, where the at least one data source includes values corresponding to at least one of the following parameters: 1) at least one meteorological condition of at least one particular locality, 2) at least one sports-related statistic, 3) at least one geographic descriptors, 4) at least one financial statistic, 5) at least one statistic regarding at least one activity of the at least one user, being derived from a personal portable computer device of the at least one user, 6) at least one statistic regarding information being stored on the personal portable computing device of the at least one user, or 7) any combination thereof; b) receiving, by at least one server, in real-time, game input from the at least one user to play the at least one personalized game, c) determining, by the at least one server, in real-time, an outcome of playing the at least one personalized game by the at least one user, and d) outputting, by the at least one server, in real-time, the outcome of playing the at least one personalized game to the at least one user, e) receiving, by a specifically programmed input device, in real-time, a vocal input from at least one user; f) dynamically determining, by the specifically programmed input device, in real-time, at least one voice characteristic of the vocal input from the at least one user, based, at least in part, on at least one of: (i) a duration of the vocal input time, and (ii) an intensity of at least one waveform, where the intensity of at least one waveform is calculated based, at least in part, on at least one of: (1) a periodic vibration of vocal folds of the at least one user, and (2) an aperiodic sound produced by turbulence at a constriction in a vocal tract of the at least one user, g) dynamically determining, by the specifically programmed input device, in real-time, at least one first game entry for the at least one personalized game, based, at least in part, on the at least one voice characteristic of the vocal input of the at least one user; h) receiving, by the specifically programmed input device, in real-time, non-vocal input from the at least one user; i) dynamically determining, by the specifically programmed input device, in real-time, at least one second game entry for the at least one personalized game, based, at least in part, on the non-vocal input of the at least one user; where the at least one first game entry, the at least one second game entry, or both identify the at least one data source for the at least one personalized game being generated by the software of the at least one server.

In some embodiments, the at least one personalized game is a lottery game. In some embodiments, the specifically programmed input device is a personal portable computing device.

In some embodiments, the computer method further includes: determining, by the at least one server, at least one well-being condition of the at least one user based, at least in part, on the at least one voice characteristic of the vocal input of the at least one user, where the at least one well-being condition is a condition selected from the group consisting of: tiredness, anxiety, intoxication, a measurable psychological condition, a measurable physiological condition, or any combination thereof; determining, by the at least one server, an ability of the at least one user to play the at least one personalized game based, at least in part, on the at least one well-being condition of the at least one user, and delivering, by the at least one server, at least one alert to the at least one user based, at least in part, on the ability of the at least one user to play the at least one personalized game being determined from the at least one well-being condition of the at least one user.

In some embodiments, the computer method includes: terminating, by the at least one server, the at least one personalized game when the at least one well-being condition is a condition selected from the group consisting of: tiredness, anxiety, intoxication, a measurable psychological condition, a measurable physiological condition, or any combination thereof.

In some embodiments, the computer method includes: a) receiving, by the specifically programmed input device, at least one payment parameter from the at least one user, and b) obtaining, by the specifically programmed input device, at least one payment based on the at least one payment parameter being received from the at least one user.

In some embodiments, the at least one payment parameter includes at least one instruction to play the at least one personalized game when a predetermined threshold set by the at least one user is reached, where the predetermined threshold identifies at least one of: a predetermined prize amount, a predetermined wallet balance, a predetermined period of time elapsed since a previous game, or any combination thereof.

In some embodiments, the computer method includes: combining, by the at least one server, the at least one first game entry, the at least one second game entry, or both, with at least one third game entry being received from at least one other user to play the at least one personalized game of the at least one user.

While a number of embodiments of the present invention have been described, it is understood that these embodiments are illustrative only, and not restrictive, and that many modifications may become apparent to those of ordinary skill in the art.

What is claimed is:

1. A computer system, comprising:
a) at least one server and software stored on a non-transient computer readable medium accessible by the at least one server;
   wherein a processor of the at least one server is configured to execute the software, causing the software to:
   i) generate, in real-time, game data for at least one personalized game based, at least in part, on at least one data source,
   wherein the personalized game is a lottery game,
   wherein the at least one data source is identified by at least one user,
   wherein the at least one data source comprises values corresponding to at least one of the following parameters:
      1) at least one meteorological condition of at least one particular locality, 2) at least one sports-related statistic, 3) at least one geographic descriptor, 4) at least one financial statistic, 5) at least one statistic regarding at least one activity of the at least one user, being derived from a personal portable computer device of the at least one user, 6) at least one statistic regarding information being stored on the personal portable computing device of the at least one user, or 7) any combination thereof;
   ii) receive, in real-time, game input from the at least one user to play the at least one personalized game, the game input including at least one first game entry and at least one second game entry,
   iii) determine, in real-time, an outcome of playing the at least one personalized game by the at least one user based, at least in part, on the game data, the at least one first game entry, and the at least one second game entry, and
   iv) output, in real-time, the outcome of playing the at least one personalized game to the at least one user;

b) at least one database accessible by the at least one server and configured to store the game data of the at least one personalized game; and
c) a plurality of specifically programmed input devices, wherein at least one of the plurality of specifically programmed input devices operated by the user is configured to:
   1) receive, in real-time, a vocal input from the at least one user;
   2) dynamically determine, in real-time, at least one voice characteristic of the vocal input from the at least one user, based, at least in part, on at least one of:
      (i) a duration of a vocal input time, and
      (ii) an intensity of at least one waveform, wherein the intensity of the at least one waveform is calculated based, at least in part, on at least one of:
         (1) a periodic vibration of vocal folds of the at least one user, and
         (2) an aperiodic sound produced by turbulence at a constriction in a vocal tract of the at least one user;
   3) dynamically determine, in real-time, the at least one first game entry for the at least one personalized game, based, at least in part, on the at least one voice characteristic of the vocal input of the at least one user, wherein the at least one first game entry defines at least one first lottery number selection;
   4) receive, in real-time, non-vocal input from the at least one user; and
   5) dynamically determine, in real-time, the at least one second game entry for the at least one personalized game, based, at least in part, on the non-vocal input of the at least one user, wherein the at least one second game entry defines at least one second lottery number selection;
   wherein the at least one first game entry, the at least one second game entry, or both identify the at least one data source for the at least one personalized game being generated by the software of the at least one server;
wherein the at least one server, the at least one database and the plurality of specifically programmed input devices are connected through a computer network;
wherein the plurality of specifically programmed input devices are at least one thousand specifically programmed input devices; and
wherein the at least one server is configured to manage, in real-time, the at least one thousand specifically programmed input devices.

2. The computer system of claim 1, wherein the specifically programmed input device is the personal portable computing device of the at least one user.

3. The computer system of claim 1, wherein execution of the software by the processor further causes the software of the at least one server to:
determine at least one well-being condition of the at least one user based, at least in part, on the at least one voice characteristic of the vocal input of the at least one user, wherein the at least one well-being condition is a condition selected from the group consisting of: tiredness, anxiety, intoxication, a measurable psychological condition, a measurable physiological condition, or any combination thereof;
determine an ability of the at least one user to play the at least one personalized game based, at least in part, on the at least one well-being condition of the at least one user; and
deliver at least one alert to the at least one user based, at least in part, on the ability of the at least one user to play the at least one personalized game being determined from the at least one well-being condition of the at least one user.

4. The computer system of claim 3, wherein execution of the software by the processor further causes the software of the at least one server to terminate the at least one personalized game when the at least one well-being condition is a condition selected from said group.

5. The computer system of claim 1, wherein the at least one specifically programmed input device is further configured to:
a) receive at least one payment parameter from the at least one user, and
b) obtain at least one payment based on the at least one payment parameter being received from the at least one user.

6. The computer system of claim 5, wherein the at least one payment parameter comprises at least one instruction to play the at least one personalized game when a predetermined threshold set by the at least one user is reached, wherein the predetermined threshold identifies at least one of:
a predetermined prize amount, a predetermined wallet balance, a predetermined period of time elapsed since a previous game, or any combination thereof.

7. The computer system of claim 1, wherein execution of the software by the processor further causes the software of the at least one server to combine the at least one first game entry, the at least one second game entry, or both, with at least one third game entry being received from at least one other user to play the at least one personalized game of the at least one user.

8. A computer method, comprising:
a) generating, by a processor of at least one server executing software stored on a non-transient computer readable medium accessible by the at least one server, in real-time, game data for at least one personalized game based, at least in part, on at least one data source, wherein the personalized game is a lottery game,
   wherein the at least one data source is identified by at least one user,
   wherein the at least one data source comprises values corresponding to at least one of the following parameters:
   1) at least one meteorological condition of at least one particular locality, 2) at least one sports-related statistic, 3) at least one geographic descriptor, 4) at least one financial statistic, 5) at least one statistic regarding at least one activity of the at least one user, being derived from a personal portable computer device of the at least one user, 6) at least one statistic regarding information being stored on the personal portable computing device of the at least one user, or 7) any combination thereof;
b) receiving, by the processor, in real-time, game input from the at least one user to play the at least one personalized game, the game input including at least one first game entry and at least one second game entry;
c) determining, by the processor, in real-time, an outcome of playing the at least one personalized game by the at least one user based, at least in part, on the game data, the at least one first game entry, and the at least one second game entry;

d) outputting, by the processor, in real-time, the outcome of playing the at least one personalized game to the at least one user;

e) receiving, by a first specifically programmed input device, in real-time, a vocal input from the at least one user;

f) dynamically determining, by the first specifically programmed input device, in real-time, at least one voice characteristic of the vocal input from the at least one user, based, at least in part, on at least one of:
   (i) a duration of the vocal input time, and
   (ii) an intensity of at least one waveform,
   wherein the intensity of at least one waveform is calculated based, at least in part, on at least one of:
      (1) a periodic vibration of vocal folds of the at least one user, and
      (2) an aperiodic sound produced by turbulence at a constriction in a vocal tract of the at least one user;

g) dynamically determining, by the first specifically programmed input device, in real-time, the at least one first game entry for the at least one personalized game, based, at least in part, on the at least one voice characteristic of the vocal input of the at least one user, wherein the at least one first game entry defines at least one first lottery number selection;

h) receiving, by the first specifically programmed input device, in real-time, non-vocal input from the at least one user; and i) dynamically determining, by the first specifically programmed input device, in real-time, the at least one second game entry for the at least one personalized game, based, at least in part, on the non-vocal input of the at least one user, wherein the at least one second game defines at least one second lottery number selection;

wherein the first specifically programmed input device is one of at least one thousand specifically programmed input devices connected through a computer network to the at least one server; and wherein the at least one first game entry, the at least one second game entry, or both identify the at least one data source for the at least one personalized game being generated by the software of the at least one server.

9. The computer method of claim 8, wherein the first specifically programmed input device is the personal portable computing device.

10. The computer method of claim 8, further comprising:
determining, by the processor, at least one well-being condition of the at least one user based, at least in part, on the at least one voice characteristic of the vocal input of the at least one user, wherein the at least one well-being condition is a condition selected from the group consisting of: tiredness, anxiety, intoxication, a measurable psychological condition, a measurable physiological condition, or any combination thereof;

determining, by the processor, an ability of the at least one user to play the at least one personalized game based, at least in part, on the at least one well-being condition of the at least one user; and delivering, by the processor, at least one alert to the at least one user based, at least in part, on the ability of the at least one user to play the at least one personalized game being determined from the at least one well-being condition of the at least one user.

11. The computer method of claim 10, comprising:
terminating, by the processor, the at least one personalized game when the at least one well-being condition is a condition selected from said group.

12. The computer method of claim 8, comprising:
a) receiving, by the first specifically programmed input device, at least one payment parameter from the at least one user, and
b) obtaining, by the first specifically programmed input device, at least one payment based on the at least one payment parameter being received from the at least one user.

13. The computer method of claim 12, wherein the at least one payment parameter comprises at least one instruction to play the at least one personalized game when a predetermined threshold set by the at least one user is reached, wherein the predetermined threshold identifies at least one of: a predetermined prize amount, a predetermined wallet balance, a predetermined period of time elapsed since a previous game, or, any combination thereof.

14. The computer method of claim 8, comprising: combining, by the processor, the at least one first game entry, the at least one second game entry, or both, with at least one third game entry being received from at least one other user to play the at least one personalized game of the at least one user.

* * * * *